June 25, 1963  H. R. SHURTLEFF ETAL  3,095,499
CONTINUOUS DIAL FEED ELECTRIC WELDING APPARATUS
Filed June 1, 1961  2 Sheets-Sheet 1

INVENTORS
HAROLD R. SHURTLEFF
VAUGHN T. JUDD
GEORGE E. BURDICK
BY Robert P. O'Connell
ATTORNEY June 25, 1963     H. R. SHURTLEFF ET AL     3,095,499
CONTINUOUS DIAL FEED ELECTRIC WELDING APPARATUS
Filed June 1, 1961     2 Sheets-Sheet 2

INVENTORS
HAROLD R. SHURTLEFF
VAUGHN T. JUDD
GEORGE E. BURDICK
BY Robert P. O'Connell
ATTORNEY United States Patent Office 3,095,499
Patented June 25, 1963

3,095,499
CONTINUOUS DIAL FEED ELECTRIC WELDING APPARATUS
Harold R. Shurtleff, Lexington, Vaughn T. Judd, Framingham, and George E. Burdick, Hudson, Mass., assignors to Raytheon Company, Lexington, Mass., a corporation of Delaware
Filed June 1, 1961, Ser. No. 114,245
5 Claims. (Cl. 219—80)

This invention pertains generally to electrical welding apparatus, and more particularly to an electrical welding apparatus having an improved work-feeding means.

The prior art is replete with different types of welding apparatus in which there is provided an automatic feeding of the workpiece to the welding station. Such machines have generally employed a rotary index table as the feeding means, or alternatively, have utilized a longitudinal index device such as an endless conveyor which effects relatively linear translatory movement of the work. Irrespective of which of these particular types of work-advance is used, the movement in each has characteristically been intermittent in the prior art, since the welding transformer has heretofore been mounted at a fixed position, and it has thus been necessary to intermittently index the successive workpieces sequentially with respect to a stationary weld-head.

As is evident, the prior art practice of employing intermittent motion in the work feed is accompanied by rather burdensome misalignment problems resulting from the hammering effect of such motion. That is to say, as a result of the sudden start-stop motion of the prior-art feeding system, the accuracy with which each work holder is sequentially indexed in alignment with the weldhead is severely impaired after a sustained period of operation of the apparatus. Additionally, where only one weld-head or electrode is employed, as in the prior art, with a plurality of work-carrying support electrodes, the weld electrode is subjected to many times the wear experienced by the work-supporting electrodes.

It is accordingly a primary object of the present invention to provide an electric welding apparatus wherein the feed of work-piece through a welding station is continuous, rather than intermittent.

Another object of the invention is to provide an electric welding apparatus in which the weld is made while the workpieces are in motion.

In accordance with a preferred form of the present invention, the above and other objects are achieved by means of a rotary plate apparatus including two electrode-supporting plates fixedly mounted on a rotary shaft in parallel spaced-apart relationship. The shaft is rotated in a continuous manner, and passes centrally through the two plates so as to impart continuous rotation to the plates. A plurality of bottom work-holding welding electrodes are mounted around the circumference of the lower of the plates in registry with a corresponding plurality of top work-holding welding electrodes circumferentially mounted on the upper plate. Since the two plates are fixedly mounted on the shaft, the opposed electrodes of each respective pair of top and bottom electrodes are maintained in registry at all times, and faulty indexing is thus precluded.

A welding transformer is mounted for rotation with the shaft and plate members, and the output of the transformer is connected across the respective pairs of opposed top and bottom electrodes. Input to the transformer is accomplished by means of slip rings. As to each such pair of opposed electrodes, the two electrodes thereof are normally spaced apart and are designed to receive and hold respective workpieces to be welded together. In order to bring the workpieces together for the weld, one set of the electrodes is mounted for reciprocal motion with respect to its plate member in the direction of the other plate. A fixed cam member is provided for successive engagement with the reciprocally mounted electrodes upon rotation of the plate members to provide the relative motion between the electrodes of the respective opposed pairs to bring the workpieces held thereby into mutual contact for the weld. A portion of this cam member is spring-loaded to urge the workpieces into increasingly intimate contact during the flow of welding current, such current resulting from the energization of the welding transformer when the spring loaded cam member is engaged by the reciprocal electrode and actuates a limit switch.

With the above considerations and objects in mind, the invention itself will now be described in connection with a preferred embodiment thereof given by way of example and not of limitation, and with reference to the accompanying drawings, in which.

Figure 1:
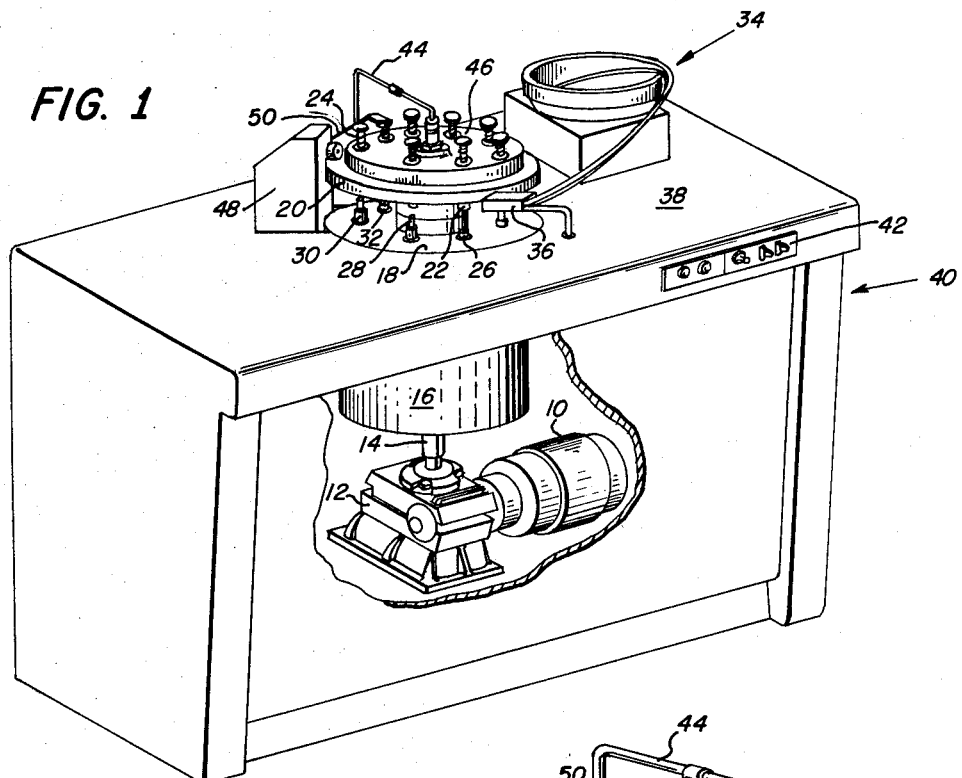
FIG. 1 is a perspective view of the over-all apparatus of the invention.

Referring now particularly to FIG. 1, a motor 10 is connected through a suitable gear box 12 or the like to a rotary drive shaft 14. A welding transformer 16 is mounted on shaft 14 for rotation therewith, the shaft being mounted centrally with the casing of transformer 16. A pair of parallel spaced-apart electrode-supporting plate members 18 and 20 are also mounted on drive shaft 14, the latter extending centrally through the two plates. The electrode-supporting plates 18 and 20 are fixedly secured to the rotary drive-shaft 14 so as to effect simultaneous rotary motion of the two plates upon rotation of shaft 14, as well as to prevent relative movement between the two plate members.

Upper plate member 20 carries a plurality of upper welding electrodes 22 which are mounted on the under face of plate 20, and which are circumferentially spaced around the periphery of the plate. A corresponding plurality of ejector pins 24 is provided for a purpose which will be explained hereinafter. Lower plate member 18 carries a corresponding plurality of lower welding electrodes, such as indicated at 26, 28, 30 and 32. The number of lower electrodes mounted on plate 18 is equal to the number of upper electrodes 22, and each of the lower electrodes is mounted in registry with a respective one of the upper electrodes 22. While upper electrodes 22 are fixed with respect to the plate member 20, the lower electrodes are mounted for reciprocal movement with respect to plate 18 in a direction parallel to the length of drive shaft 14. That is to say, the lower electrodes which are mounted in plate member 18 are maintained in exact registry with each of the respective upper electrodes 22, but these lower electrodes are free to move toward and away from each such respective upper electrode. The normal position for the lower electrodes is the position of electrodes 26 and 32 in FIG. 1; this is the position in which the electrode receives a workpiece and passes through one or more check stations prior to arrival at the welding station. As will be further described below, as each of the lower electrodes approaches the welding head, it is cammed upwardly (as indicated by electrodes 28 and 30 in FIG. 1) to move the workpiece held by the lower electrode into contact with a corresponding workpiece held by the respective upper electrode in order to effect the weld.

The apparatus of the present invention is adaptable to many different welding applications, each with its own particular requirements. Generally speaking, however, a vibratory feed unit such as is indicated at 34 in FIG. 1 may be employed to feed workpieces to the several lower electrodes in sequence. Also, a second suitable workpiece feeding device (not hown) may be employed to feed workpieces to the respective upper electrodes 22. Further, suitable means such as a pivotally mounted injecting nozzle 36 may be employed to apply a suitable oil to the lower workpieces prior to the welding operation. The workpiece feeding means 34 and the oil injecting member 36 may conveniently be mounted on the work-table surface 38 of the cabinet member 40. The work-feeding device for the upper electrodes may also be mounted on table surface 38, or, alternatively, may in some applications be mounted on the upper electrode-supporting plate member 20. A suitable set of control means 42 will normally be provided on the cabinet member 40.

It will normally be necessary to provide means for firmly gripping the several workpieces in the upper and lower welding electrodes between the time of inserting the workpieces in the electrodes and the time of completion of the weld. In this connection, a vacuum line 44 is provided for upper electrode-supporting plate 20, with vacuum line 44 feeding from a cover member 46 for the plate 20 to a suitable source of vacuum. With the tubular upper electrodes 22 all lying within the periphery of the cover member 46, when the pressure in line 44 is significanlty reduced, air is drawn into cover member 46 through each of the tubular upper electrodes 22. Thus, when a suitable workpiece is applied to any of the upper electrodes, it is held therein by means of the partial vacuum created thereby. It will be understood that a similar vacuum-holding structure may be provided for the lower electrode-supporting plate 18. Further, the means for gripping the workpieces in the respective electrodes may take some other suitable form, such as a magnetic gripping means or the like.

The welding station in FIG. 1 is represented by the housing 48, which is positioned with respect to the rotating electrode-supporting plates 18 and 20 at that point where the lower electrodes are cammed upwardly to effect the weld. This welding head is shown in greater detail in FIGS. 2 and 3. A stationary cam member 50 is provided for depressing each of the ejector pins 24 after they pass the welding station 48. Depression of the ejector pins 24 causes the workpiece held by the corresponding upper electrode 22 (such workpiece, at this point in the operation of the apparatus, comprising the finished welded assembly) to be ejected into a suitable receiving means (not shown).

Figure 2:
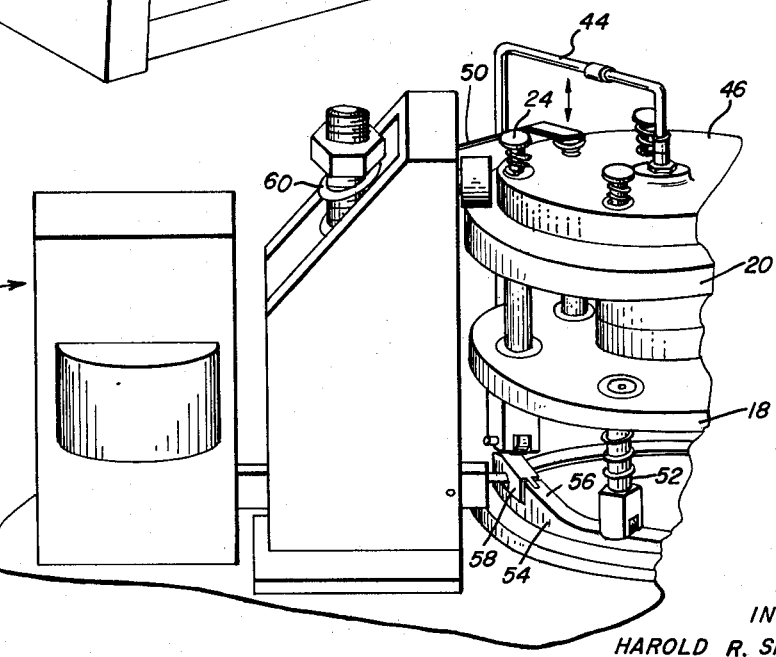
FIG. 2 is a perspective view of the rotary electrode-supporting plate members and the welding station, with portions being removed for clarity of description.

FIG. 2 shows the details of the structure on the underside of lower plate 18 for effecting the reciprocal movement of the lower electrodes. Each of the lower electrodes is urged downwardly by a respective helical spring member 52 into engagement with a cam track 54. In the neighborhood of the welding station, the cam track 54 rises gradually in the vertical direction as indicated at 56 in FIG. 2 to slide the lower electrodes upwardly toward the corresponding upper electrodes in top plate 20. Cam track 54 has a floating section comprising a spring-loaded rocker arm 58 which serves to urge the several lower electrodes even further in the vertical direction during the welding operation in order to enhance the weld. Rocker arm 58 is spring loaded by means of the helical spring 60, the latter comprising a part of the welding station and being shown in greater detail in FIG. 3. Also, the action of helical spring 60 may be accentuated by the use of solenoid 62, also seen in greater detail in FIG. 3.

Figure 3:
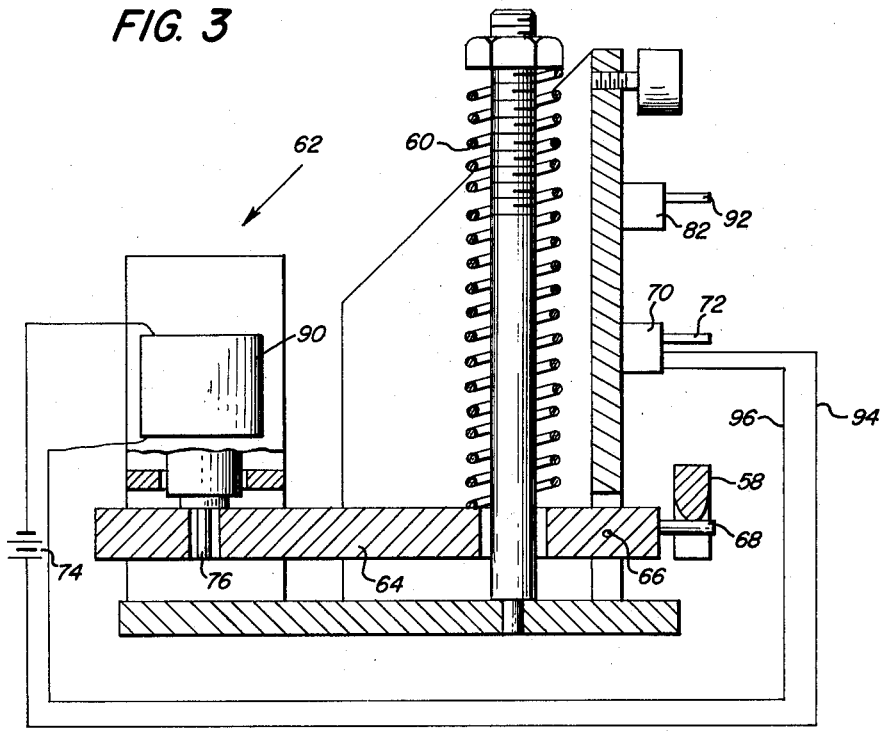
FIG. 3 is a vertical section view taken centrally of the welding station.

Referring now to FIG. 3, it will be seen that helical spring 60 and solenoid 62 both bear against and exert a downward force on a lever arm 64, the latter being pivoted at the fulcrum 66 and having a pin 68 thereon in engagement with the floating rocker arm 58 forming a part of cam track 54 as described above. Helical spring 60 provides a constant downward force on the left-hand portion of lever arm 64, with a corresponding continuous upward force thereby being applied to the floating section 58 of cam track 54. Further, when the lower electrodes successively engage the floating cam section 58 they also actuate a suitable electrical switch 70, as by striking the operating member 72 thereof, thereby energizing the solenoid 62 by means of closing the circuit which includes switch 70, leads 94 and 96, voltage source 74 and solenoid coil 90. Upon such energization of solenoid 62, the armature 76 thereof is moved downwardly, carrying the lever arm 64 in a counterclockwise direction, and thereby further increasing the force applied to floating cam section 58 to urge the latter upwardly to enhance the weld. A switch 82 is also mounted adjacent switch 70 and signals the welding process to start upon engagement of its operating member 92.

Figure 4:
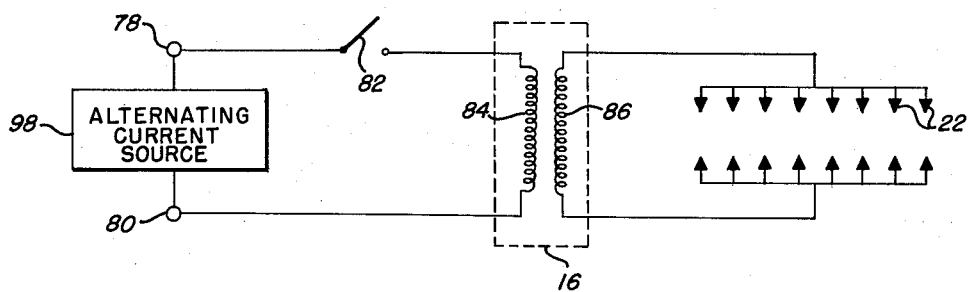
FIG. 4 is a schematic diagram of a preferred form of the electrical circuitry of the invention.

FIG. 4 is a schematic diagram of a preferred form of the circuit for providing welding current to the several welding electrodes. The input terminals 78 and 80 are adapted to be connected to a suitable source 98 of alternating current. A switch 82 adapted to be operated by the presence of a welding electrode in the welding station (such switch, for example, being mounted adjacent switch 70, shown in FIG. 3) serves to complete the circuit to the primary wniding 84 of welding transformer 16. One end of secondary winding 86 of the welding transformer is connected to each of the upper electrodes 22 mounted in upper plate member 20. Similarly, the other end of secondary winding 86 is connected to the lower electrodes which are carried by lower plate 18. It will be seen that as each lower electrode is raised by the cam track, the secondary circuit is completed, and the weld takes place when the primary circuit is also completed.

The operation of the apparatus of the present invention is readily evident from the foregoing description of the structure. It will be understood that the loading of the workpieces in the respective electrodes may be manual, semiautomatic or completely automatic, depending upon the needs in a given application and upon the manner in which automatic loading devices are employed in connection with the apparatus of this invention. In any case, the workpieces are received by the several respective upper and lower electrodes, and are firmly gripped thereby by means of the vacuum, or magnetic gripping means described. This loading of the electrodes, along with a suitable oil-fill and one or more test procedures to make certain that the workpieces are properly in place, takes place with respect to a given pair of opposed upper and lower electrodes prior to the time that the lower electrode of such pair engages the vertically-rising portion of the cam track 54.

As each lower electrode begins to ride up on the rising portion 56 of cam track 54, the workpiece held by such lower electrode is raised toward engagement with the workpiece which is held in the corresponding upper electrode 22. When this lower electrode is riding on floating member 58 of cam track 54, the paired workpieces are in full engagement, switch 82 is actuated to pass welding current through the workpieces and switch 70 is actuated to energize solenoid 62 to in turn enhance the upward force applied to floating cam member 58 by the helical spring 60. It will be appreciated that each of these elements of the operation takes place while the electrodes and the supporting plate members are in continuous motion, as opposed to the intermittent motion characteristic of the prior art machines.

Once the weld is completed, the switches 70 and 82 are opened, welding current ceases and the particular lower electrode in question rides down the descending side (not shown) of the cam portion 54 to return the lower electrode to its normal position. Since the workpieces have now been welded together, the assembly of such workpieces is retained in the upper electrode by virtue of the vacuum gripping means. Upon further rotation of the plate members, the ejector pin 24 associated with the particular upper electrode in question is depressed by cam 50 to release the vacuum grip on the welded assembly, permitting the latter to be discharged from the machine as the finished product thereof.

The invention has been described above in considerable detail, and particularly with reference to its application to a machine for welding together a pair of separate workpieces. However, it will be apparent to those skilled in the art that the invention is also applicable to the welding together of more than two separate workpieces, as well as the welding of separate workpieces to portions of a supply of wire or the like which is continuously supplied for the welding operation, as by continuous feed through tubular upper electrodes. Hence, the invention is not to be considered as limited to the particular details given, nor to the specific application to which reference has been made during the description of the apparatus except insofar as may be required by the scope of the appended claims.

What is claimed is:

1. A continuous dial feed electric welding apparatus, comprising a rotary drive shaft, motor means for effecting continuous rotation of said shaft, a welding transformer mounted for rotation with said shaft, upper and lower plate members fixedly mounted on said shaft in substantially parallel spaced-apart relationship, said shaft mounted substantially centrally through said plate members, a plurality of opposed pairs of upper and lower electrodes each adapted to receive and support a respective one of two workpieces to be welded together, said upper electrodes being mounted on said top plate member in circumferentially-spaced relationship, said lower electrodes being mounted on said lower plate member in circumferentially-spaced relationship in registry with respective ones of said upper electrodes, said lower electrodes being mounted for movement toward and away from said respective upper electrodes, a cam member mounted adjacent said lower plate member and adapted to engage said lower electrodes sequentially to effect translation toward each respective upper electrode to bring the respective workpieces held thereby into mutual engagement, electrical conductors connecting said upper electrodes to one side of the output of said welding transformer and connecting said lower electrodes to the other side of said transformer, an electrical switch operative to energize said transformer when a pair of workpieces are brought into contact by engagement of said cam member and a second electrode, and a second cam member mounted adjacent said first-mentioned cam member in the path of travel of said lower electrodes so that said lower electrodes engage said second cam member just after engaging said first-mentioned cam member, said second cam member being spring-loaded to urge each engaging lower electrode toward the upper electrode of its respective pair to enhance the weld.

2. A continuous dial feed electric welding apparatus, comprising a rotary drive shaft, motor means for effecting continuous rotation of said shaft, a welding transformer mounted for rotation with said shaft, upper and lower plate members fixedly mounted on said shaft in substantially parallel spaced-apart relationship, said shaft extending substantially centrally through said plate members, a plurality of opposed pairs of upper and lower electrodes each adapted to receive and support a respective one of two workpieces to be welded together, said upper electrodes being mounted on said top plate member in circumferentially-spaced relationship, said lower electrodes being mounted on said lower plate member in circumferentially-spaced relationship in registry with respective ones of said upper electrodes, said lower electrodes being mounted for movement toward and away from said respective upper electrodes, a cam member mounted adjacent said lower plate member and adapted to engage said lower electrodes sequentially to effect translation thereof toward each respective upper electrode to bring the respective workpieces held thereby into mutual engagement, electrical conductors connecting said upper electrodes to one side of the output of said welding transformer and connecting said lower electrodes to the other side of said transformer, a second cam member mounted adjacent said first-mentioned cam member in the path of travel of said lower electrodes so that said lower electrodes engage said second cam member just after engaging said first-mentioned cam member, said second cam member being spring-loaded to urge each engaging lower electrode toward the upper electrode of its respective pair to enhance the weld, and an electrical switch operative to energize said transformer when a lower electrode is in engagement with said second cam member.

3. A continuous dial feed electric welding apparatus, comprising a rotary drive shaft, motor means for effecting continuous rotation of said shaft, a welding transformer mounted for rotation with said shaft, upper and lower plate members fixedly mounted on said shaft in substantially parallel spaced-apart relationship, said shaft extending substantially centrally through said plate members, a plurality of opposed pairs of upper and lower electrodes each adapted to receive a respective one of two workpieces to be welded together, said upper electrodes being mounted on said top plate member in circumferentially-spaced relationship, said lower electrodes being mounted on said lower plate member in circumferentially-spaced relationship in registry with respective ones of said upper electrodes, said lower electrodes being mounted for movement toward and away from said respective upper electrodes, a cam member mounted adjacent said lower plate member and adapted to engage said lower electrodes sequentially to effect translation thereof toward each respective upper electrode to bring the respective workpieces held thereby into mutual engagement, electrical conductors connecting said upper electrodes to one side of the output of said welding transformer and connecting said lower electrodes to the other side of said transformer, a second cam member mounted adjacent said first-mentioned cam member in the path of travel of said lower electrodes so that said lower electrodes engage said second cam member just after engaging said first-mentioned cam member, said second cam member being spring-loaded to urge each engaging lower electrode toward the upper electrode of its respective pair to enhance the weld, a solenoid the armature of which is connected to said second cam member to urge said second cam member in the direction of such spring-loading upon the energization of said solenoid, and a second electrical switch operative to energize said solenoid when one of said lower electrodes is in engagement with said second cam member.

4. Electric welding apparatus comprising a base, supporting means rotatable on said base about an axis, a track on said base, opposed upper and lower sets of electrodes carried by the supporting means, each individual electrode thereof supporting an article to be welded, at least one of the sets of electrodes being movable toward and away from the other set, cam means on said track for successively moving the individual electrodes in said movable set thereof toward opposed electrodes to position individual pairs of articles to be welded in mutual engagement, second cam means on said track adjacent said first cam means for successive engagement by said movable electrodes immediately after movement thereof by the first cam means, operating means for moving said second cam means to cause additional urging of the respective movable electrodes toward the opposing electrodes, and means for applying electrical voltage between said respective movable and opposed electrodes when said second cam means is operated to effect welding of the articles supported thereby.

5. Electric welding apparatus comprising a base, supporting means rotatable on said base about an axis, a track on said base, opposed upper and lower sets of electrodes carried by said supporting means, one of the sets of electrodes being movable toward and away from the other set, cam means on said track for successively moving the individual electrodes in said movable set toward respective opposed electrodes, second cam means on said track adjacent said first cam means for successive engagement by said movable electrodes, and operating means connected with said second cam means and operable when a movable electrode is in engagement therewith for moving said second cam means to cause additional urging of the respective movable electrodes toward opposing electrodes.

References Cited in the file of this patent

UNITED STATES PATENTS

| | | |
|---|---|---|
| 1,504,088 | Bransten | Aug. 5, 1924 |
| 2,618,725 | Renard | Nov. 18, 1952 |
| 2,929,913 | Miller | Mar. 22, 1960 |
| 2,939,058 | Masterson | May 31, 1960 |
| 2,967,229 | Chuma et al. | Jan. 3, 1961 |
| 2,984,733 | Born | May 16, 1961 |